Jan. 17, 1956 E. A. MEYER 2,731,297
HYDRAULICALLY OPERATED LIQUID SPRAYER
Filed Sept. 19, 1952 2 Sheets-Sheet 1
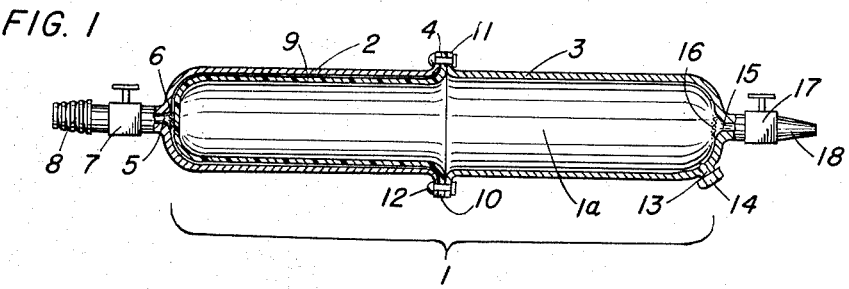
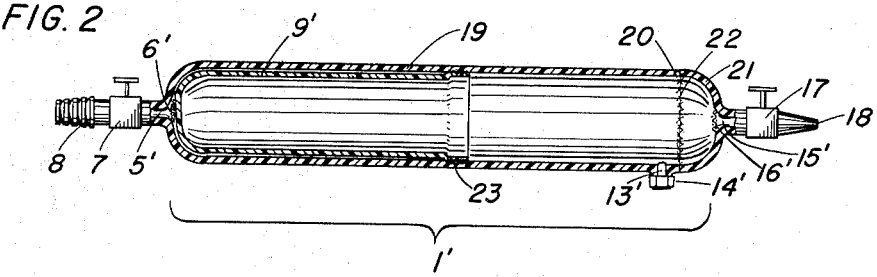
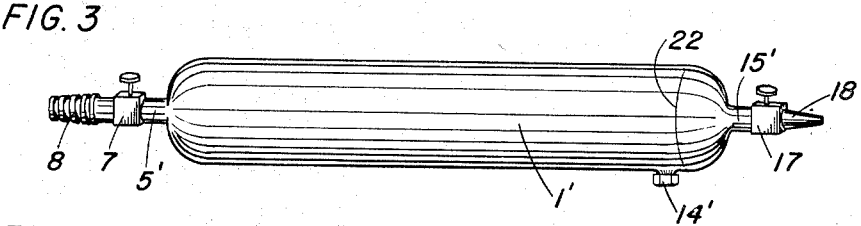
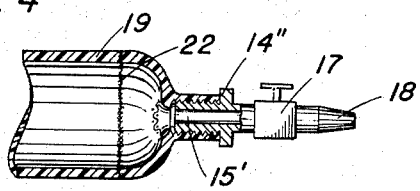
INVENTOR.
EARL A. MEYER
BY
Attorney Jan. 17, 1956  E. A. MEYER  2,731,297
HYDRAULICALLY OPERATED LIQUID SPRAYER
Filed Sept. 19, 1952  2 Sheets-Sheet 2
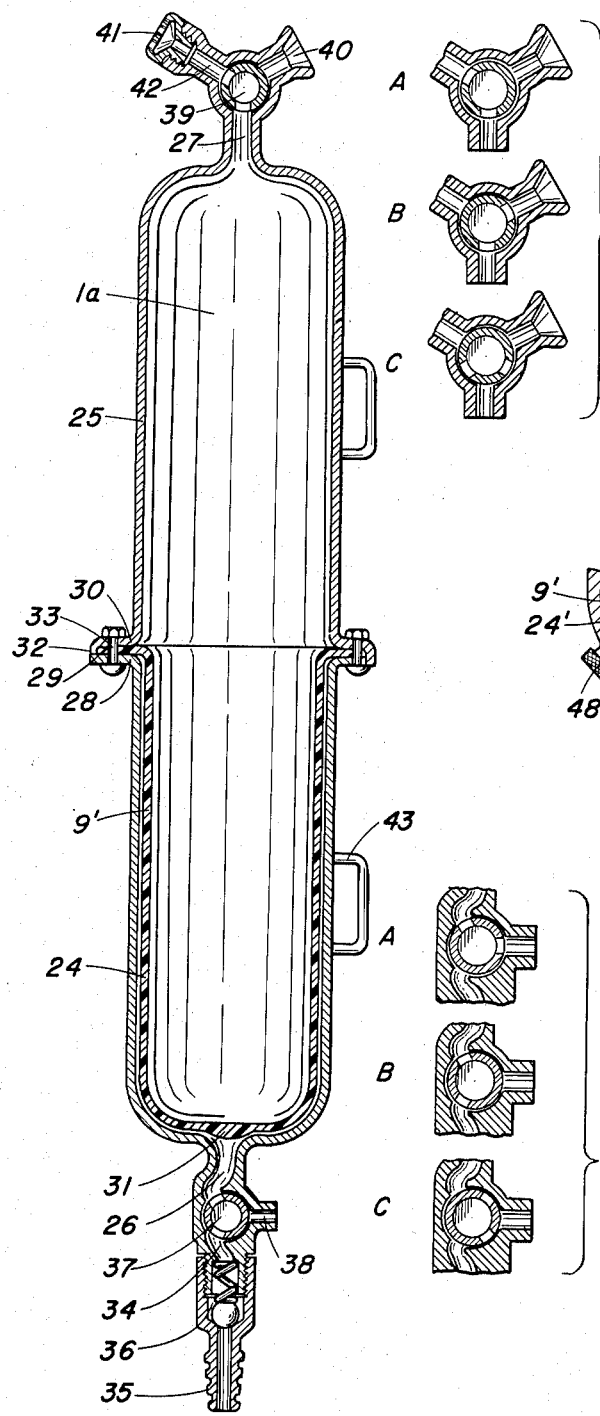
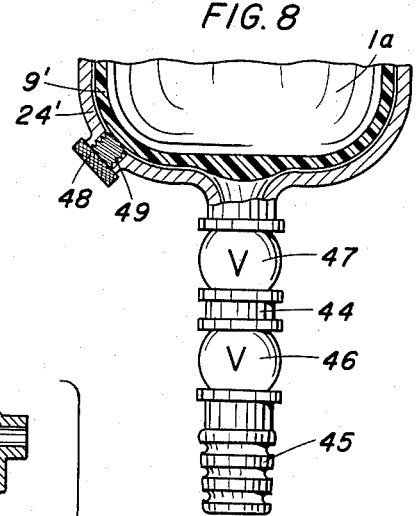
INVENTOR.
EARL A. MEYER
BY
Attorney

United States Patent Office 2,731,297
Patented Jan. 17, 1956

2,731,297
HYDRAULICALLY OPERATED LIQUID SPRAYER

Earl A. Meyer, Madison, Wis., assignor to Bjorksten Research Laboratories, Inc., a corporation of Illinois Application September 19, 1952, Serial No. 310,449

2 Claims. (Cl. 299—92)

This invention relates to spraying devices, and more particularly to spraying devices for distribution of chemical spray solutions, which are powered and actuated by water pressure.

Heretofore, garden spray chemicals such as growth accelerators, fertilizers, and particularly insecticides and fungicides, have been sprayed using manually operated pumps. Although they are not expensive, they are usually heavy and cumbersome in operation. On the other hand, the motor driven compressor type of pump requires little effort from the operator but is much too expensive a luxury for the average gardener.

An object of the present invention is therefore a simple, light, low cost device, powered directly by water pressure to spray a premixed solution.

Another object is a device for spraying chemical solutions, which is of a conveniently handled cylindrical shape and which may be operated simply by attachment to a convenient source of water pressure such as a garden hose.

Other objects and the full scope of my invention will become apparent from the drawings and the following detailed description in which like reference numerals refer to like parts and in which it is my intention to illustrate the applicability of the invention and in which:

Figure 1 is a longitudinal cross-sectional view of one embodiment;

Figure 2 is a longitudinal cross-sectional view of an embodiment composed almost entirely of plastic; and Figure 3 is an elevation in perspective of the embodiment of Figure 2;

Figure 4 is a longitudinal cross-sectional view of a portion of another embodiment wherein the filler and outlet openings are combined;

Figure 5 is a longitudinal cross-sectional view of another embodiment in which a check valve is provided at the inlet and in which three-way valves are provided at both outlet and inlet to facilitate operation without removal from the water supply hose;

Figure 6 is a schematic cross-sectional view showing the three positions of the inlet valve in the embodiment of Figure 5;

Figure 7 is a schematic cross-sectional view showing the three positions of the outlet valve in the embodiment of Figure 5;

Figure 8 is a partially cut away view of the inlet end of another embodiment.

Referring now to Figure 1, there is shown a generally cylindrical vessel indicated as 1, which consists of two substantially identical portions 2 and 3. Portion 2 consists of a cylindrical vessel open at one end and provided with flange 4 at said end, being closed at the other end and provided with valve 7 and with means for attaching hose or tubing thereto such as threads or annular projections 8 on tubing connected to the upstream side of valve 7. The device is provided with flexible partitioning member 9, which consists of a flexible material which is impermeable to water and resistant to chemicals, such as rubber, and which is of substantially cylindrical shape such that it conforms closely to the interior contours of portion 2. Bag 9 is provided with an open end coextensive with the open end of portion 2 and is provided at said open end with flange 10 adapted to overlie flange 4 of portion 2. Portion 3 is also provided with an open end and flange 11 adapted to mate with flange 4, flange 10 being interposed thereinbetween. Thus portions 2 and 3 may be fastened securely together with bolts 12, a water-tight joint being provided by flange 10 of bag 9 which acts as a gasket for the joint. Cylindrical portion 3 is fitted with a filler opening 13 and a cap 14 therefor; filler opening 13 is preferably remote from flange 11. The end of portion 3 which is furthest remote from flange 11 is closed and is provided with outlet 15 having a screen 16 overlying the opening into outlet 15; outlet 15 is further provided with a valve 17 and spray nozzle 18. Vessel 1 may be made of any suitable material such as steel, stainless steel, aluminum or laminated plastic. In use, the device is arranged with nozzle 18 upwards; filler cap 14 is removed and the interior 1a is filled with a chemical solution which it is desired to spray upon trees or shrubbery. Filler cap 14 is replaced and a garden hose, or other suitable source of water pressure, is attached to vessel 1 at 8, valve 7 being closed. Valve 7 is then opened and the pressure of water thus introduced through inlet 5 causes a pressure to be applied through bag 9 to the solution with which 1a has been filled. Valve 17 may then be opened and said solution will spray forth through spray nozzle 18. As the solution is forced through nozzle 18 bag 9 gradually collapses and turns inside out and chamber 1a becomes filled with water separated from the chemical solution by bag 9. When said chemical solution is entirely exhausted, bag 9 is disposed adjacent to the interior of portion 3 and screen 16 overlying outlet 15 thereof prevents any portion of bag 9 from being forced outwardly through outlet 15. The device may be prepared for operating again by first removing cap 14 and disconnecting the water pressure source from 8 or opening a drain valve or plug (not shown) in or near tube 5 and then refilling through opening 13. During refilling bag 9 assumes its original position due to vacuum produced by water pouring out through tube 5 and due to pressure of the solutions introduced through 13.

Referring now to Figures 2 and 3 there is shown another embodiment in which vessel 1' corresponding to vessel 1 is not composed of two sections but is composed of a single cylinder 19 having both ends closed. The cylinder having both ends closed may be composed as shown of cylinder 19 which may be laminated plastic provided with a closed end and with an open end at 20 having welded thereto cap 21 at 22 to close open end 20. Bag 9' instead of being provided with a flange and being mechanically clamped between two halves of the device, may be attached by the use of heat or adhesives at 23 to the interior surface of cylinder 19 at a line all points of which are substantially equidistant from inlet 5' and outlet 15'. Inlet 5' and outlet 15' are provided with screens 6' and 16' respectively to prevent bag 9 from being forced into the interior of either inlet 5' or outlet 15' with resultant damage to bag 9'. The device shown in Figures 2 and 3 is operated substantially in the same manner as that shown in Figure 1.

As shown in Figure 4, outlet 15 or 15' may be closed with a filler cap 14" provided with valve 17 and spray nozzle 18 attached thereto and if this is done, filler opening 13 or 13' and cap 14 or 14' may be omitted. The manner in which flexible bag 9 or 9' is attached to chambers 1 and 1' is immaterial. It may be cemented, heat sealed, clamped with screws or screwed together as a unit; any other means of fastening which provides a positive seal between the individual chambers may be used. This positive seal is useful in preventing contamination between the chambers in certain applications where poisonous fluid is to be put under pressure.

As material for the container, I may employ any structural material which lends itself to the requirements of pressure and chemically resistant construction.

Suitable materials include certain metals and certain plastics; aluminum, magnesium, stainless steel or steel may suitably be used; low pressure low temperature laminating thermosetting synthetic resins, such as certain phenolic resins, melamine resins or polyester styrenated resins reinforced with fibers or fabric of glass or cotton, or the like, may suitably be used; plastics suitable for injection or compression molding are also suitable, such as styrene of styrene derivating resins, copolymers of styrene with other resins, such as acrylonitrile, polymers and copolymers of vinyl halides and/or vinyl acetate, polymers and copolymers of acrylic acid, methacrylic acid and/or their esters, cellulose esters and ethers such as cellulose butyrate, cellulose acetebutyrate, cellulose acetate, ethyl cellulose, and the like, polyamides, and polyvinyl acetals, such as polyvinylbutyral. As the material for the diaphragm and for valve parts in certain embodiments I may use any suitable flexible material, such as, for example, rubber—natural or synthetic—polyvinylbutyral, neoprene, plasticized vinyl chloride, and the like.

Referring now to Figure 5 there is shown another embodiment of the device in which chamber 1a is formed of cylindrical sections 24 and 25 provided respectively with an inlet 26 and outlet 27 and with mating flanges 28 and 30 providing means for joining sections 24 and 25. Bag 9' adapted to conform to the interior contours of either 24 or 25 alternatively is provided with flange 29 which is disposed between flanges 28 and 30 and acts as a seal thereinbetween. Bag 9' is provided with a thickened end 31 which obviates the need for screens at the inlet and outlet. One of the cylindrical sections, such as section 25, is provided with an additional short cylindrical member 32 disposed at the flange portion thereof and adapted to surround flanges 28 and 29 for the sake of protecting said flanges and improving the appearance thereof. Flanges 28, 29 and 30 may be secured together by bolts 33. Tube 34 leads to inlet 26 and is provided with means such as annular projections 35 for attaching tubing thereto, a ball check valve such as valve 36, and a three way valve such as plug-cock valve 37, which may be arranged in any one of the following three positions as shown in Figure 6:

| Position | Function |
| --- | --- |
| A | Flow from chamber 1a (upstream of bag 9') outwardly thru outlet 38. |
| B | Flow through tubing 34 and check valve 36 into chamber 1a (upstream of bag 9'). |
| C | Shutoff. |

Outlet 27 may be provided with a three-way valve such as plug-cock valve 39 leading from chamber 1a (downstream of bag 9') to filler opening 40, which may be somewhat funnel shaped as shown, or spraying outlet 41. This valve may be disposed to any one of the following three positions as shown in Figure 7:

| Position | Function |
| --- | --- |
| A | Flow from chamber 1a (downstream of bag 9') through tubing 42 to spraying nozzle 41. |
| B | Flow from filler opening 40 through outlet 27 into chamber 1a (downstream of bag 9'). |
| C | Shutoff. |

In use, outlet valve 39 is first turned to position B and inlet valve 37 is turned to position A. The chemical solution which it is desired to spray is then poured into the device thru somewhat funnel-shaped opening 40 to fill chamber 1a; valve 39 is then placed in position C and valve 37 is placed in position B; water thereupon may flow thru check-valve 36 into chamber 1a (upstream of bag 9'), thus placing the said chemical solution under pressure; valve 39 may then be turned to position A whereupon chemical solution has been sprayed out, the device may be refilled by again turning valves 37 and 39 respectively to positions A and B respectively, whereupon water flows out of the upstream side of chamber 1a and additional chemical solution may be introduced thru opening 40; bag 9' then becomes again displaced towards the upstream side of chamber 1'; the valves are then again turned into the aforementioned positions suitable for spraying chemical solution and the cycle may subsequently be repeated as many times as necessary. It is desirable that bag 9' be secured at the median line which divides chamber 1a into two equal portions in such manner that leakage of chemical solution at such joint will leak into the outer atmosphere and will not leak into the upstream side of chamber 1a, since such chemical solutions are often extremely poisonous and as a safety precaution it is desirable to prevent any possibility of leakage of such solutions into the hose line which may be used for other purposes than operating the spraying device. Ball check-valve 36 is provided as an additional precaution against the hazard of having any poisonous chemical solution in the hose line which might occur in the event that bag 9 became punctured or cracked, allowing the chemical solution to enter the upstream portion of chamber 1a.

Referring now to Fig. 8 there is shown another embodiment of the upstream end of the device wherein a water supply line may be attached to inlet tubing 44 by means of threads or annular projections 45. Water from said supply source may flow through check-valve 46 and through shut-off valve 47 in order to enter chamber 1a on the upstream side of bag 9'. Shut-off valve 47 may partially take the place of a three-way valve such as valve 37; in order to make provisions for draining chamber 1a upstream of bag 9', plug 48 may then be provided, threadedly inserted in drain opening 49.

The device may, if desired, be fitted with one or more handles such as 43 to make it more readily portable.

The invention can be used for a variety of purposes, including spraying of paints, lacquers, gases, aerosols, and any liquid material.

It is thus seen that the invention is broad in scope and is not to be restricted excepting by the claims, in which it is my intention to cover all novelty inherent in this invention as broadly as possible, in view of prior art.

Having thus disclosed my invention, I claim:

1. A device for spraying liquid comprising a substantially cylindrical chamber having a single inlet at one end thereof and a single outlet at the other end thereof and provided with a flexible partitioning member in the interior thereof, said member being secured thereto at a circumference thereof substantially midway between said inlet and said outlet, said partitioning member adapted to extend alternatively to one end of the chamber or to the other end and to conform with the interior contours of each end of said chamber, said inlet being provided with a check valve and with a three-position valve for shutting off and regulating the flow of liquid therethrough, having a drain-port in one side thereof and adapted to provide for flow from a supply source into said chamber, to shut off flow from said source and at the same time provide drain-flow from said chamber through said drain-port and to shut off all flow and inadapted to provide simultaneously a flow from said source and into said chamber and out said drain-port; said check valve being upstream of said three-way valve and being adapted to prevent back-flow of poison-containing fluids from said chamber into tubulature connected with said source and being entirely enclosed within a tube connected directly with said valve and adapted to be connected with a supply source; said outlet having attached directly thereto a three-position valve and said valve having attached directly thereto a spraying nozzle and substantially funnel-shaped filling receptacle, said valve being adapted to provide for flow from said chamber through said spraying nozzle, to provide for flow from said receptacle into said chamber and to shut off all flow.

2. A device for spraying liquids comprising in combination a substantially cylindrical chamber provided with a single inlet at one end and with a single outlet at the other end, and provided with a flexible partitioning member, substantially impermeable to liquids, secured to said vessel substantially on a line in a plane passing through the vessel in a manner to divide it into two substantially cylindrical portions of equal volume said line being substantially the locus of points on the interior of said vessel equidistant from said inlet and said outlet, said impermeable member being adapted to conform to the interior contour of either of said portions of said vessel, said inlet being provided with a check valve and with a three-position valve for shutting off and regulating the flow of liquid therethrough, having a drain-port in one side thereof and adapted to provide for flow from a supply source into said chamber, to shut off flow from said source and at the same time provide drain-flow from said chamber through said drain-port and to shut off all flow and inadapted to provide simultaneously a flow from said source and into said chamber and out said drain-port; said check valve being upstream of said three-way valve and being adapted to prevent back-flow of poison-containing fluids from said chamber into tubulature connected with said source and being entirely enclosed within a tube connected directly with said valve and adapted to be connected with a supply source; said outlet having attached directly thereto a three-position valve and said valve having attached directly thereto a spraying nozzle and substantially funnel-shaped filling receptacle, said valve being adapted to provide for flow from said chamber through said spraying nozzle, to provide for flow from said receptacle into said chamber and to shut off all flow.

References Cited in the file of this patent

UNITED STATES PATENTS

| Number | Name | Date |
|---|---|---|
| 103,498 | Pohlmann | May 24, 1870 |
| 382,610 | Holmes | May 8, 1888 |
| 1,471,091 | Bessesen | Oct. 16, 1923 |
| 1,632,559 | Pedrick | June 14, 1927 |
| 1,743,056 | Whitaker | Jan. 7, 1930 |
| 1,971,450 | Heitmuller | Aug. 28, 1934 |
| 2,097,985 | Maryott | Nov. 2, 1937 |
| 2,177,032 | Baumgardner | Oct. 24, 1939 |
| 2,323,341 | McGill | July 6, 1943 |
| 2,618,510 | Mills | Nov. 18, 1952 |